United States Patent [19]

Stafford

[11] 4,206,105

[45] Jun. 3, 1980

[54] POLYACRYLATE RUBBER-MODIFIED VINYLIDENE CHLORIDE COPOLYMER COMPOSITIONS

[75] Inventor: Owen L. Stafford, Midland, Mich.

[73] Assignee: The Dow Chemical Company, Midland, Mich.

[21] Appl. No.: 967,545

[22] Filed: Dec. 7, 1978

[51] Int. Cl.$^2$ .............................................. C08F 265/04
[52] U.S. Cl. ............................. 260/29.6 RB; 525/193
[58] Field of Search .................. 260/29.6 RB, 876 R, 260/884, 899

[56] References Cited

U.S. PATENT DOCUMENTS

| | | | |
|---|---|---|---|
| 3,206,427 | 9/1965 | Butzler | 260/899 |
| 3,334,156 | 8/1967 | Calentine | 260/884 |
| 3,424,706 | 1/1969 | Smith | 260/29.6 RB |
| 3,723,571 | 3/1973 | Haskell | 260/884 |
| 3,846,828 | 11/1974 | Klein | 260/884 |
| 4,143,011 | 3/1979 | Hisazumi | 260/884 |

*Primary Examiner*—Paul R. Michl
*Attorney, Agent, or Firm*—S. S. Grace; P. A. Bielinski

[57] ABSTRACT

A blend of vinylidene chloride copolymer and a vinylidene chloride copolymer-polyacrylate rubber latex. The latex component is prepared by emulsion polymerization of a mixture of vinylidene chloride monomer, selected comonomer and a cross-linked polyacrylate rubber obtained from specified acrylate monomers. Articles made from these blends exhibit good low temperature strength properties due to the incorporation of the polyacrylate rubber.

12 Claims, No Drawings

POLYACRYLATE RUBBER-MODIFIED VINYLIDENE CHLORIDE COPOLYMER COMPOSITIONS

BACKGROUND OF THE INVENTION

Vinylidene chloride copolymers have found wide application in films, injection molded or vacuum formed articles, tubing or pipe, flat sheet and similar end uses. This wide variety of uses is due in part to the copolymers' fire retardant properties, such as low smoke generation and high limiting oxygen index. However, such copolymers have had limited use in low temperature application due to the loss of strength or toughness.

In the past, efforts have been made to reinforce vinylidene chloride copolymer compositions with additive formulations. For example, unsaturaed butadiene rubbers have been incorporated into the vinylidene chloride copolymer composition. While low temperature impact strength was improved, aging of these compositions brought about accelerated degradation of the rubber causing embrittlement. U.S. Pat. No. 3,240,743 shows an additive system of a saturated rubber latex which is physically blended with the vinylidene chloride copolymer.

The present invention is based on the discovery that a cross-linked polyacrylate rubber from specified monomers when incorporated into a vinylidene chloride copolymer composition in the manner herein-prescribed has a beneficial effect on low temperature toughness of the resultant polymer compositions.

SUMMARY OF THE INVENTION

The present invention is a blend composition comprising (A) a vinylidene chloride copolymer and (B) a vinylidene chloride copolymer-polyacrylate rubber latex prepared by emulsion polymerization of an aqueous mixture containing (1) vinylidene chloride monomer, (2) a monoethylenically unsaturated comonomer and (3) a cross-linked polyacrylate rubber obtained from an acrylate monomer of the formula:

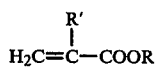

wherein R is an alkyl hydrocarbon radical having at least 3 carbon atoms and R' is hydrogen or a methyl radical.

The blend composition can be prepared by physically admixing Components A and B which have been made separately. The vinylidene chloride copolymer (Component A) is prepared conventionally such as by emulsion polymerization. Component B is prepared by emulsion polymerization of a mixture which includes the vinylidene chloride, a comonomer and the prescribed polyacrylate rubber. A key feature of the present invention is the polymerization of part of the vinylidene copolymer in the presence of the polyacrylate rubber. Component B thus provides a vinylidene copolymer-polyacrylate rubber concentrate which is then blended with a vinylidene chloride polymer.

Component B can be mixed with a dry or aqueous slurry of a vinylidene chloride copolymer prepared by suspension polymerization (Component A) and the mixture dried and melt blended in an extruder or similar device to form a dried blend of the claimed latex composition.

The blend composition of the present invention can also be made in a batchwise manner. Such method comprises (a) emulsion polymerizing an aqueous mixture containing sufficient vinylidene chloride and monoethylenically unsaturated comonomer to produce from about 55 percent to about 95 percent, preferably from about 70 to about 80 percent, of the total vinylidene chloride copolymer desired; (b) adding to the resultant copolymer latex the remainder of the vinylidene chloride monomer and the monoethylenically unsaturated comonomer, and from about 1 to about 40 weight percent, based on the total weight of the latex blend, of a cross-linked polyacrylate rubber obtained from an acrylate monomer of the formula:

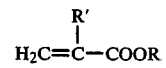

wherein R is an alkyl hydrocarbon radical having at least 3 carbon atoms and R' is hydrogen or a methyl radical; (c) and emulsion polymerizing the resultant mixture. Thus, again, a portion of the vinylidene chloride copolymer is polymerized in the presence of the selected polyacrylate rubber composition. The vinylidene chloride copolymer-polyacrylate rubber composition (Component B) is thus formed in situ in the second stage emulsion polymerization step.

The blend composition can be used as such for coatings, cast latex film, carpet backing formulations, and the like.

The present latex blend composition can be formed into a powder such as by drying or coagulating and drying the latex blend. The resultant powder can be utilized in a variety of end uses noted above by conventional formulating and fabricating techniques. Products, such as molded articles, prepared from the blend compositions of the present invention exhibit good low temperature strength properties, thereby expanding the uses for the vinylidene chloride copolymer compositions. Such products additionally exhibit relatively low smoke generation when forced to burn.

DETAILED DESCRIPTION

The vinylidene chloride copolymers useful for this invention are well-known and may be prepared by interpolymerizing vinylidene chloride with known comonomers. Typical of normally crystalline polymeric materials falling within the scope of the present invention are the copolymers and interpolymers consisting of from 70 to 97 percent by weight of vinylidene chloride with the remainder composed of one or more other monoethylenically unsaturated comonomers. For example, ethylene, propylene, isobutylene, vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, and allyl esters and ethers. Known ternary compositions also may be employed advantageously. Representatives of such polymers are those consisting of from 70 to 97 percent by weight of vinylidene chloride with the remainder made up of, for example, acrolein and vinyl chloride, acrylic acid and acrylonitrile, alkyl acrylates and alkyl methacrylates, acrylonitrile and itaconic acid, acrylonitrile and vinyl acetate, vinyl propionate and vinyl chloride, allyl esters or ethers and vinyl chloride, and vinyl ethers and vinyl chloride. Quarternary polymers of similar monomeric composition are also known.

Vinylidene chloride copolymers included within the present invention are prepared in accordance with procedures well-known in the art such as by emulsion polymerization utilizing conventional polymerization conditions, catalysts, and emulsifying agents.

The polymer blends of the present invention may include plasticizers, antioxidants, light stabilizers, pigments and dyes, or a fire retardant synergist such as antimony oxide.

The blends are prepared by mixing the vinylidene chloride copolymer and the vinylidene chloride copolymer-polyacrylate rubber composition. The proportions of Components A and B are adjusted such that the weight percent of the polyacrylate rubber solids in the blend is from about 1 to about 40, preferably from about 10 to about 25, based on the total weight of the blend.

Component B of the present blend again uses conventional comonomers for the vinylidene chloride. The comonomer can be the same or different from the comonomer used to prepare Component A. The amount of polyacrylate rubber employed to prepare Component B can vary widely; normally from about 30 to about 90 weight percent based of the total weight of Component B.

The polyacrylate rubber additive in the present invention is prepared by emulsion polymerization of an acrylate monomer having the following formula:

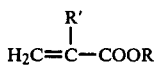

wherein R is an alkyl hydrocarbon radical having at least 3 carbon atoms and R' is hydrogen or a methyl radical. Preferably, R has 3 to 20 carbon atoms. Minor amounts, for example, on the order of 1-5 weight percent, based on the total weight of the rubber, of comonomers can be used, such as a halogen-containing comonomer to enhance fire retardant properties.

The cross-linked polyacrylate rubber is prepared by conventional emulsion polymerization including any necessary emulsifiers and cross-linking agents,. Emulsifiers include sodium dihexyl sulfosuccinate or sodium dodecyl benzosulfonate. Cross-linking agents, such as trimethylolpropane triacrylate, are added in amounts to provide a lightly cross-linked rubbery (non-glassy) polymer product, for example, on the order of 0.5 to 1.5 weight percent, based on the total weight of the polyacrylate rubber. The emulsion polymerization is carried out at elevated temperature in an agitated reactor to produce a latex polymer composition with an average latex particle size of from 1,000 Å to 10,000 Å. The resulting latex is then used as a component in the formation of the vinylidene chloride copolymer-polyacrylate rubber concentrate (Component B) or, to make the blend composition of the present invention directly in the batchwise manner previously referred to.

The batchwise process for making the blend composition is carried out in at least a two-stage polymerization. The first stage polymerization is that of the conventional polymerization of a portion of the vinylidene chloride monomer and one or more of the above-defined comonomers (Component A). The resultant polymer is then admixed with the remainder of the vinylidene chloride monomer and comonomer, and the polyacrylate rubber composition. This mixture is then subjected to a second stage emulsion polymerization, to produce the blend latex composition.

A particularly preferred embodiment of the present invention is the use of butylacrylate, both as the comonomer for Components A and B. Resultant polymer blends utilizing the butylacrylate comonomer have excellent low temperature properties without significant sacrifice in fire retardant properties (low smoke generation, high limiting oxygen index and stable char). This is particularly important for applications such as communications cable jacketing. Powders from the blends of the present invention are melt extruded around wire or cable by conventional techniques.

The following examples are representative of the present invention.

EXAMPLE 1

Making the Polyacrylate Rubber

The following aqueous solution was introduced into a reactor with an agitator with controlled speed (parts by weight): 169 parts deionized water, 0.125 part sodium dodecylbenzylsulfonate emulsifier and 0.20 part sodium persulfate catalyst. The reactor was closed and evacuated to 29 inches of mercury, then pressurized to 10 psig with nitrogen. Then 2.6 parts by weight (out of 100 parts) of the following monomer mixture was added to the reactor: 99.5 parts n-butylacrylate and 0.5 part trimethylolpropane triacyrlate cross-linking agent. The reactor agitator was run at 250 rpm and the reactor heated to 57° C. After 15 minutes the rest of the monomer mixture was added at a constant rate so that the total addition time was about 4 hours.

An emulsifying solution of 13 parts deionized water and 1.75 parts sodium dodecyl benzosulfonate was added to the reactor at a constant rate, after the first hour of monomer addition, so that the addition time for the emulsifying solution was about 2 hours.

After all the monomer had been added, polymerization was continued for 2 more hours, the reactor was vented, a vacuum pulled for one more hour and the contents cooled. The resultant polymer latex average particle size as measured by light scanning was about 2,000 Å in diameter and the latex consisted of 33-35 percent nonvolatile solids. The recovered rubber was greater than 95 percent the charged monomers. This polyacrylate rubber latex serves as a component in the next step of the formation of the blend.

Making the Blend Composition

A reactor was loaded with the following aqueous solution (parts by weight): 137 parts deionized water, 0.04 part sodium dodecyl benzolsulfonate and 0.17 part sodium persulfate catalyst. The reactor was closed and evacuated at 29 in. Hg and the following monomer mixture added: 59.52 parts vinylidene chloride and 4.48 parts n-butylacrylate comonomer. With the agitator running at 250 rpm the reactor was heated to 57° C. After 1.5 hours at temperature, the following emulsifier solution was added to the reactor: 13 parts deionized water and 0.6 parts sodium dodecyl benzosulfonate. The emulsifying solution was added at a rate such that the addition time was 2 hours. After the polymerization reaction was complete as indicated by a drop in pressure, additional monomer mixture of 19.53 parts vinylidene chloride and 1.47 parts n-butylacrylate was added to the reactor along with 15 parts or rubber latex solids from the polyacrylate rubber made above (44.1 parts of the 34 percent solids latex product). After another 5 hours in the reactor, the reactor was vented, vacuum pulled for one more hour and the contents cooled. The product was a latex blend of about 35 pecent solids and an average particle diameter of 1,600 Å (Example 1).

Making the Powder

The above latex blend product was formed into a powder by slowly adding 100 parts of such latex blend into 180 parts of deionized water containing 0.5 parts of $Al_2(SO_4)_3.18H_2O$ at 15° C. with vigorous agitation. The pH of the resultant slurry was raised to 5.5 using 5 percent sodium hydroxide solution. The slurry was rapidly heated to 85° C. to crystallize the product. The composition was then cooled to room temperature with ice and the solid product filtered off. The product was washed with deionized water and air dried for 48 hours.

EXAMPLE 2

Making the Polyacrylate Rubber

An aqueous solution (parts by weight) of 185 parts deionized water, 1.5 parts dihexyl sulfosuccinate, and 0.2 parts sodium persulfate catalyst was introduced into the reactor with controlled agitator. After evacuation and pressurization 50 parts of the following mixture was added (percent by weight): 94.5 percent n-butyl acrylate, 5.0 percent vinylidene chloride (optional comonomer used in this example), and 0.5 percent, 1,4-butylene glycol diacrylate crosslinker. The monomer mixture was polymerized at 50° C. for 5.6 hours.

Making Component B

50 Parts of a second monomer mixture (percent by weight) of 7 percent n-butyl acrylate and 93 percent vinylidene chloride was then added to the reactor and polymerized at 50° C. overnight (about 14 hours). The resultant latex composition had 34.5 percent solids and an average latex particle size of 1480 Å.

Making Component A

The reactor was loaded with the following aqueous solution (parts by weight): 185 parts deionized water, 1.5 parts dihexyl sulfosuccinate and 0.2 parts sodium persulfate catalyst. After evacuation and pressurization the following monomer mixture was added: 7 parts n-butyl acrylate and 93 parts vinylidene chloride. The mixture was polymerized at 50° C. for 17 hours. The resultant vinylidene chloride copolymer latex had 34.8 percent solids and an average latex particle size of 1770 Å.

Making of the Blend

40 Parts of Component B and 60 parts of Component A of this example (on a non-volatile solids basis) were admixed to form a blend latex composition (Example 2).

EXAMPLE 3

40 Parts of Component B from Example 2 and 60 parts of a vinylidene chloride/vinyl chloride copolymer containing about 20 weight percent vinyl chloride (on a non-volatile solids basis) were admixed to form a blend latex composition (Example 3).

Powder samples were made from the latex blends of Examples 2 and 3 using procedures of Example 1 except that the pH was adjusted to only 4.5.

EXAMPLE 4

Making the Polyacrylate Rubber

Following the same general procedure as Example 1 a polyacrylate rubber latex composition was made. An aqueous solution (parts by weight) of 136 parts deionized water, 0.7 parts dihexyl sulfosuccinate and 0.2 parts sodium persulfate catalyst was introduced into the reactor. After evacuation and pressurization, a monomer mixture of 90 parts 2-ethyl hexyl acrylate, 0.5 part trimethylolpropane triacrylate and 9.5 parts vinylidene chloride was fed into the reactor at 57° C. at a constant rate so that the total addition time was about 4.0 hours.

An emulsifying solution of 32 parts of deionized water and 0.7 part dihexyl sulfosuccinate was added to the reactor at a constant rate, after 1.2 hours of monomer addition, so that the addition time for the emulsifying solution was 2.0 hours.

After all the monomer had been added, polymerization was continued for 2.3 more hours, the reactor vented, a vacuum pulled for one more hour and the contents cooled. The resultant polymer latex average particle size as measured by light scanning was greater than 3000 Å in diameter and the latex consisted for 36.5 percent non-volatile solids. The polyacrylate rubber latex served as a component in the next step of the formation of the blend.

Making the Blend Composition

A reactor was loaded with the following aqueous solution (parts by weight): 151 parts deionized water, 1.2 parts dihexyl sulfosuccinate and 0.16 parts sodium persulfate catalyst. The reactor was closed and evacuated at 29 in. Hg and the following monomer mixture added. 4.2 parts n-butyl acrylate and 55.8 parts vinylidene chloride. With the agitator running at 250 rmp the reactor was heated to 57° C. After 4.4 hours, additional monomer mixture of 2.8 parts n-butyl acrylate and 17.2 parts vinylidene chloride was added to the reactor along with 20 parts of rubber latex solids from the polyacrylate rubber made above (54.6 parts of 36.6 percent solids latex product). After another 2.8 hours in the reactor, the reactor was vented, vacuum pulled for one more hour and the contents cooled. The product was a latex blend of about 34.7 percent solids and an average particle diameter of 2240 Å (Example 4).

The above latex blend was made into a powder form in the same manner as Example 1.

Low temperature strength properties of moldings made from the blend powders of the present invention were tested by an impact test procedure using equipment smaller than but similar to an Izod impact tester. The sample molding was mounted in a temperature controlled clamp and struck with a pendulum weight. The maximum angle of the swing of the pendulum after striking the sample is directly related to the force required to break the sample. The angle is measured by a potentiometer circuit which provides a voltmeter readout. The voltmeter readout $\times$ 100 is the impact strength value reported. The higher the number the more force required to break the sample.

The test apparatus has a vertical support arm to which is attached a pendulum with 180 grams weight at a length of 36 cm (about 14 inches). The pendulum is raised and held at about 125° angle from the vertical support. Slightly below the arc travelled by the pendulum and perpendicular to the vertical support arm is a metal clamp fitted with a temperature controlled jacket which permits heating or cooling of the clamp and any sample placed in the clamp. In these tests a heat transfer fluid in the jacket was employed to reduce the temperature of the clamp and specimen to −5° C. and in some cases −15° C. Just before the pendulum is released, the sample is pushed up through the clamp and jacket about ⅜" and into the path of the pendulum weight.

A potentiometer was mounted co-axially with the pivot of the pendulum. This potentiometer is adjusted so as to engage the pendulum arm as it moves past the vertical support. With no sample in the clamp, the pendulum is released and a voltmeter attached to a second potentiometer is adjusted to zero. The voltmeter is further adjusted to read 1.0 if the sample does not break upon being hit with the pendulum weight, i.e., the angle after striking the sample is zero and the impact value equals 100.

Molded samples from Examples 1–4 were prepared by compression molding powders from these examples into specimens of 2.50"×0.50"×0.050". The powder samples were compressed at 170° C. for one minute at 1000 pounds ram pressure and then 80,000 pounds ram pressure for two minutes; this is equivalent to about 50–60 psi for one minute and then 2000 psi for two minutes. Eight specimens for each example were made. The samples were mounted in the clamp with the broad face placed in the path of the pendulum weight. The clamp and sample were cooled and the sample moved into the path of the pendulum weight. The pendulum was released and the voltmeter reading recorded. An average of the voltmeter readings for the eight samples provided the impact strength value at the particular temperature involved. Impact value of 100 indicates none of the eight specimens broke.

|  | Impact Values | |
|---|---|---|
| Example | −5° C. | −15° C. |
| 1 | 100 | Not done |
| 2 | 100 | 51 |
| 3 | 57 | 33 |
| 4 | 62 | 40 |

An average impact value for vinylidene chloride/20 weight percent vinyl chloride copolymer is less than 20 at both −5° C. and −15° C. Thus, the blend compositions of the present invention show significant improvement in low temperature strength. Also smoke density tests (N.B.S. Smoke Chamber) on Examples 2 and 3 produced low smoke density values although somewhat higher than vinylidene chloride/20 percent vinyl chloride coplymer.

Comparative Examples

Vinylidene polymer latex blends similar to the above example were prepared except that the amount of vinylidene chloride monomer and comonomer mixture polymerized prior to the addition of the polyacrylate rubber additive was varied. Moldings from powders of each of the resultant polymer blends was tested as to impact strength as noted above. The following table present the results.

TABLE

| Example No. | Percent Vinylidene Chloride Copolymer Made Before Rubber Addition | Impact Value at −5° C. |
|---|---|---|
| Comparative A | 0 | 56 |
| Comparative B | 50 | 69 |
| Example 1 | 75 | 100 |
| Comparative C | 100 | 72 |

What is claimed is:

1. A blend composition comprising (A) a vinylidene chloride copolymer and (B) a vinylidene chloride copolymer-polyacrylate rubber latex prepared by emulsion polymerization of an aqueous mixture containing (1) vinylidene chloride comonomer, (2) a monoethylenically unsaturated comonomer and (3) a cross-linked polyacrylate rubber obtained from an acrylate monomer of the formula:

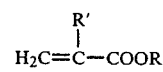

wherein R is an alkyl hydrocarbon radical containing at least 3 carbon atoms and R' is hydrogen or a methyl radical, and wherein the vinylidene chloride copolymer contains from 70 to 97 percent by weight of vinylidene chloride with the remainder composed of one or more other monoethylenically unsaturated comonomers.

2. The blend composition of claim 1 wherein R is an alkyl hydrocarbon radical having from 3 to 20 carbon atoms.

3. A blend composition of claim 1 wherein the proportions of Components A and B are such that the amount of polyacrylate rubber in the blend is within the range of about 1 to about 40 weight percent.

4. A blend composition of claim 1 wherein the polyacrylate rubber is polybutylacrylate and the comonomer is n-butylacrylate.

5. The latex composition of claim 1 wherein the polyacrylate rubber has an average particle size within the range of from about 1,000 Å to 10,000 Å.

6. A powder prepared from the blend composition of claim 1.

7. A vinylidene chloride copolymer-polyacrylate rubber latex composition prepared by emulsion polymerization of an aqueous mixture containing vinylidene chloride monomer, a monoethylenically unsaturated comonomer and a cross-linked polyacrylate rubber obtained from a acrylate monomer of the formula:

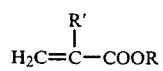

wherein R is an alkyl hydrocarbon radical having at least 3 carbon atoms, and R' is hydrogen or methyl radical.

8. The latex composition of claim 7 wherein trimethylolpropane triacrylate is the crosslinker used in making the polyacrylate rubber.

9. A process for producing a vinylidene chloride copolymer latex blend which comprises:
   (a) emulsion polymerizing an aqueous mixture containing sufficient vinylidene chloride and a monoethylenically unsaturated comonomer to produce from about 55 percent to about 95 percent of the total vinylidene chloride copolymer latex desired, wherein said vinylidene chloride copolymer contains from 70 to 97 percent by weight of vinylidene chloride, (b) adding to the resultant polymer latex the remainder of the vinylidene chloride and monoethylenically unsaturated comonomer, and from about 1 to about 40 weight percent based on the total weight of the blend composition of a cross-linked polyacrylate rubber obtained from an acrylate monomer of the formula:

$$H_2C=\underset{\underset{\displaystyle R'}{|}}{C}-COOR$$

wherein R is an alkyl hydrocarbon radical having at least 3 carbon atoms and R' is hydrogen or a methyl radical, and (c) emulsion polymerizing the resultant mixture.

10. The latex blend produced by the method of claim 9.

11. The method of claim 9 including the additional steps of coagulating and drying the latex to produce a powder.

12. The powder produced by the method of claim 11.

UNITED STATES PATENT AND TRADEMARK OFFICE
CERTIFICATE OF CORRECTION

PATENT NO. : 4,206,105
DATED : June 3, 1980
INVENTOR(S) : Owen L. Stafford

It is certified that error appears in the above-identified patent and that said Letters Patent are hereby corrected as shown below:

Col. 1, line 15, "application" should read -- applications --;

Col. 1, line 19, "unsaturaed" should read -- unsaturated --;

Col. 2, line 45, title "DETAILED DESCRIPTION" should read -- DETAILED EMBODIMENTS --;

Col. 3, line 44, delete "," after "agents";

Col. 4, line 29, "triacyrlate" should read -- triacrylate --;

Col. 4, line 48, "serves" should read -- served --;

Col. 4, line 54, "benzolsulfonate" should read -- benzosulfonate --;

Col. 4, line 68, "parts or" should read -- parts of --;

Col. 5, line 5, "pecent" should read -- percent --;

Col. 5, line 30, delete "," after "percent";

Col. 6, line 25, "for 36.5" should read -- of 36.5 --;

Col. 6, lines 34 and 35, "evau-cated" should read --evacuated --;

Col. 6, line 36, "added." should read -- added: --;

UNITED STATES PATENT AND TRADEMARK OFFICE
CERTIFICATE OF CORRECTION

Page 2 of 2

PATENT NO. : 4,206,105
DATED : June 3, 1980
INVENTOR(S) : Owen L. Stafford

It is certified that error appears in the above-identified patent and that said Letters Patent are hereby corrected as shown below:

Col. 6, line 37, "rmp" should read -- rpm --;

Col. 7, line 25, "80,000" should read -- 30,000 --;

Col. 8, line 34, "3. A" should read -- 3. The --;

Col. 8, line 38, "4. A" should read -- 4. The --.

Signed and Sealed this

Second Day of September 1980

[SEAL]

Attest:

SIDNEY A. DIAMOND

Attesting Officer

Commissioner of Patents and Trademarks